(12) United States Patent
Karl

(10) Patent No.: US 11,635,249 B1
(45) Date of Patent: Apr. 25, 2023

(54) MAGNETIC CLOSURE ASSEMBLY AND METHOD OF ASSEMBLING THE SAME

(71) Applicant: WHIRLPOOL CORPORATION, Benton Harbor, MI (US)

(72) Inventor: Jackson Felipe Karl, Stevensville, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 0 days.

(21) Appl. No.: 17/533,500

(22) Filed: Nov. 23, 2021

(51) Int. Cl.
*F25D 23/02* (2006.01)
*B23P 15/26* (2006.01)

(52) U.S. Cl.
CPC .......... *F25D 23/028* (2013.01); *B23P 15/26* (2013.01)

(58) Field of Classification Search
CPC ...... F25D 23/02; F25D 23/028; F25D 23/025; F25D 23/04; F25D 2323/02; F25D 2323/021; F25D 2323/023; B23P 15/26; Y10T 29/49359
See application file for complete search history.

(56) References Cited

U.S. PATENT DOCUMENTS

| | | | | | |
|---|---|---|---|---|---|
| 2,471,635 | A | * | 5/1949 | Vennice | E05C 19/161 49/478.1 |
| 3,248,159 | A | * | 4/1966 | Hall | E05C 19/161 49/478.1 |
| 3,408,772 | A | * | 11/1968 | Frehse | F25D 23/087 49/478.1 |
| 3,634,971 | A | * | 1/1972 | Kesling | F25D 23/02 49/478.1 |
| 3,786,386 | A | * | 1/1974 | Cardone | H01F 7/0252 101/382.1 |
| 3,942,853 | A | * | 3/1976 | Grimm | F25D 11/02 312/407 |
| 4,330,310 | A | * | 5/1982 | Tate, Jr. | F25D 21/04 62/275 |
| 4,732,432 | A | * | 3/1988 | Keil | F25D 23/082 220/592.06 |
| 5,309,680 | A | * | 5/1994 | Kiel | F25D 23/082 49/478.1 |
| 5,816,080 | A | * | 10/1998 | Jeziorowski | F25D 23/087 49/478.1 |
| 6,036,294 | A | * | 3/2000 | Banicevic | F25D 23/069 312/407 |
| 6,266,970 | B1 | * | 7/2001 | Nam | F25D 23/028 62/277 |
| 6,910,301 | B2 | * | 6/2005 | Kalempa | E06B 7/16 49/367 |
| 7,008,032 | B2 | * | 3/2006 | Chekal | F25D 23/02 49/316 |
| 7,823,331 | B2 | * | 11/2010 | Linkmeyer | F25D 23/087 49/478.1 |

(Continued)

*Primary Examiner* — Jason L Vaughan
(74) *Attorney, Agent, or Firm* — Brooks Kushman P.C.

(57) ABSTRACT

A method including forming a housing configured to house a number of first magnets; fixing the number of first magnets to the housing to form a magnetic sub-assembly; and attaching the magnetic sub-assembly to at least one of the closure or the body. The magnetic sub-assembly being configured to cooperate with a number of second magnets disposed on either the closure or the body, so that when the closure is in the closed position, a magnetic force between the magnetic sub-assembly and the number of second magnets biases the closure towards the body.

20 Claims, 6 Drawing Sheets

(56) References Cited

U.S. PATENT DOCUMENTS

| | | | |
|---|---|---|---|
| 8,944,541 B2 * | 2/2015 | Allard | F25D 23/063 |
| | | | 312/406 |
| 9,052,135 B2 * | 6/2015 | Trulaske, Sr. | F25D 23/028 |
| 9,441,872 B2 | 9/2016 | Park et al. | |
| 9,661,940 B2 * | 5/2017 | Schneider | E06B 7/16 |
| 10,126,041 B2 | 11/2018 | Park et al. | |
| 10,400,504 B2 * | 9/2019 | Boucher | E06B 3/66371 |
| 10,563,905 B1 * | 2/2020 | Allard | F25D 23/028 |
| 10,648,725 B2 | 5/2020 | Park et al. | |
| 10,808,990 B2 | 10/2020 | Koo | |
| 10,823,495 B2 | 11/2020 | Koo | |
| 11,112,165 B2 * | 9/2021 | Heckler | F25D 23/028 |
| 11,162,731 B2 * | 11/2021 | Aranda | F25C 1/24 |
| 2009/0007587 A1 * | 1/2009 | Lanzl | F25D 23/02 |
| | | | 62/449 |
| 2011/0315693 A1 * | 12/2011 | Cur | F25D 23/063 |
| | | | 29/890.035 |

\* cited by examiner

US 11,635,249 B1

MAGNETIC CLOSURE ASSEMBLY AND METHOD OF ASSEMBLING THE SAME

TECHNICAL FIELD

The present disclosure generally relates to appliances such as a refrigerator.

BACKGROUND

Appliances such as refrigerators, warming drawers, washers, dryers, and the like may include a number of closure elements such as doors or bins that may be moved between a closed position and an open position. Some closure elements may include one or more magnets that provide a magnetic force to bias or force the closure element towards a mating body to seal the closure element to the mating body.

SUMMARY

According to a first embodiment, a method of assembling a magnetic closure assembly to an appliance is provided. The appliance may include a body and a closure that may be configured to move between a closed position, in which a mating surface of the closure lies along the body, and an open position, in which the mating surface is spaced apart from the body. The method may include forming a housing configured to house a number of first magnets; fixing the number of first magnets to the housing to form a magnetic sub-assembly; and attaching the magnetic sub-assembly to at least one of the closure or the body. The magnetic sub-assembly may be configured to cooperate with a number of second magnets that may be disposed on the other of the at least one closure or the body, so that when the closure is in the closed position, a magnetic force between the magnetic sub-assembly and the number of second magnets biases the closure towards the body.

According to another embodiment, a method of assembling a magnetic closure assembly to an appliance is provided. The appliance may include a body and a closure that may be configured to move between a closed position, in which a mating surface of the closure lies along the body, and an open position, in which the mating surface is spaced apart from the body. The method may include attaching a number of magnets to a number of sleeves to form a number of magnetic sub-assemblies; applying an adhesive to the number of magnetic sub-assemblies; and positioning the number of magnetic sub-assemblies on the closure so that the number of sub-assemblies are fixed to the closure by the adhesive and positioned to cooperate with the body so that when the closure is in the closed position or a partially open position, a magnetic force between the magnetic sub-assembly and the body biases the closure towards the body.

According to yet another embodiment, a method of assembling a closure assembly for a refrigerator is provided. The method may include forming a first body defining a first opening and a first receptacle accessible through the first opening; molding plastic material into a second body configured to be fixed to the first body and configured to move between an open position, in which the opening is open, and a closed position, in which the opening is closed; attaching a magnetic gasket member to the first body so that the magnetic gasket is perimetrically disposed about one or more portions of the opening; fixing a first number of magnets to a first sleeve to form a first magnetic sub-assembly; and positioning the first magnetic sub-assembly on a wall of the closure so that the first magnetic sub-assembly is fixed to the wall and lies in a common plane with a first portion of the magnetic gasket member.

BRIEF DESCRIPTION OF THE DRAWINGS

FIG. 3A illustrates a cross-sectional view taken along the lines A-A in FIG. 3.

DETAILED DESCRIPTION

Figure 1:
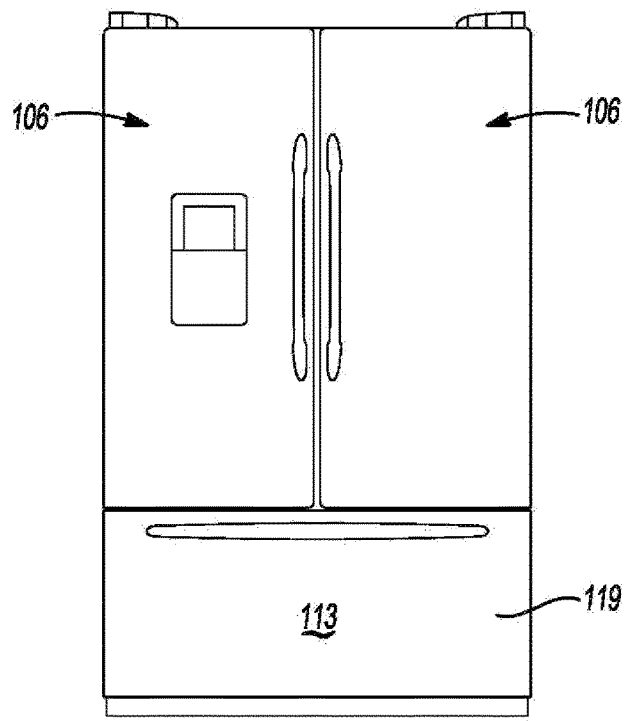
FIG. 1 illustrates a plan view of an exemplary French-Door Bottom Mount type refrigerator according to one or more embodiments.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

When an element or layer is referred to as being "on." "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between." "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Refrigerators may generally include a number of different compartments that each attempt to maintain different temperatures. For example, ice makers or compartments that contain ice makers require cooler temperatures than another compartment where liquids or non-frozen food is stored. Compartments for ice makers are generally accessible by way of a dispenser that allows a user to dispense a desired amount of ice, for example for a beverage. Some ice makers include a removable tray or bin that a user may remove a relatively large quantity of ice to fill a cooler, for example. The removable tray or bin may be accessed by opening an access door, that when closed, conceals and attempts to mitigate heat transfer between the ice compartment and other portions of the refrigerator. Proper sealing between the access door and the portion of the refrigerator that houses the ice maker may improve efficiency of the refrigerator and may prevent a buildup in condensation within the ice compartment. When frozen, the condensation may accumulate and result in frost within the ice maker and freezer compartments or clumping of the ice stored therein.

Commercially available appliances, including refrigerators, may include one or more gaskets that may be disposed between a closure member, such as a bin or the access door and the portion of the appliance or refrigerator that engages or mates with the closure member or access door. Magnets may also be provided between the closure member (e.g., access door, bin, or refrigerator door) and refrigerator body (e.g., refrigerator cabinet, main refrigerator door, drawer cavity or receptacle). Magnets may be disposed in or integrally formed with one or more of the gaskets that may be disposed on or within the closure member, the refrigerator body, or both. Gaskets are generally formed of relatively flexible materials configured to be routed or bent about a periphery of the closure member or an opening defined by the refrigerator body.

As such, magnetic gaskets are limited to relatively small magnets so that the gaskets may be bent to conform to the desired shape and these smaller magnets may not provide sufficient magnetic forces to provide proper sealing between the closure member and the refrigerator body. Alternatively, a number of larger and relatively rigid magnets may be assembled to the closure member, refrigerator body, or both. While these relatively larger and more rigid magnets may provide an improved seal due to the greater magnetic force applied between the closure member and the refrigerator body, assembling the larger and relatively rigid magnets is labor intensive. As an example, each of the larger and rigid magnets must be individually fixed to the closure member or the refrigerator body. Manual assembly of the magnets may cause inconsistent placement of the magnets or the gaskets that contain magnets and inconsistent placement may result in a relatively low magnetic force which may lead to air infiltration and inefficient operation of the appliance.

Referring generally to the figures, a magnetic closure assembly 112 and a method of assembling the same are provided. The magnetic closure assembly 112 may be configured for use in a number of commercial or household appliances including but not limited to a refrigerator 100, a dishwasher, washer, dryer, warming drawer, or a refrigerated drawer. The appliance such as a refrigerator 100 may include a closure member (e.g., fresh food compartment door 106, access door 108, a fresh food compartment door 106, a freezer door 119) and a body (e.g., refrigerator cabinet 102, a fresh food compartment door 106, a freezer door 119). The closure member may be configured to move (e.g., pivot, translate, tip) between a closed position, in which a receptacle 120 or storage area formed by the body is inaccessible, and an open position, in which the receptacle 120 is open or accessible. The magnetic closure assembly 112 may include a housing 144 and a number of magnets 116 that may collectively form a magnetic sub-assembly 118.

The magnetic sub-assembly 118 may be attached or fixed to either the closure member or the body and may be arranged to extend around at least a peripheral portion of an opening 122 that may extend into the receptacle 120. The magnetic sub-assembly 118 may be configured to cooperate with another magnetic assembly, such as a magnetic gasket 124. If the magnetic sub-assembly 118 is fixed to the closure member, the magnetic gasket 124 may be disposed on or fixed to the body so that the closure member is biased towards the body, by a magnetic attraction between the magnetic sub-assembly 118 and the magnetic gasket 124 when the closure member in or substantially near the closed position.

Figure 2:
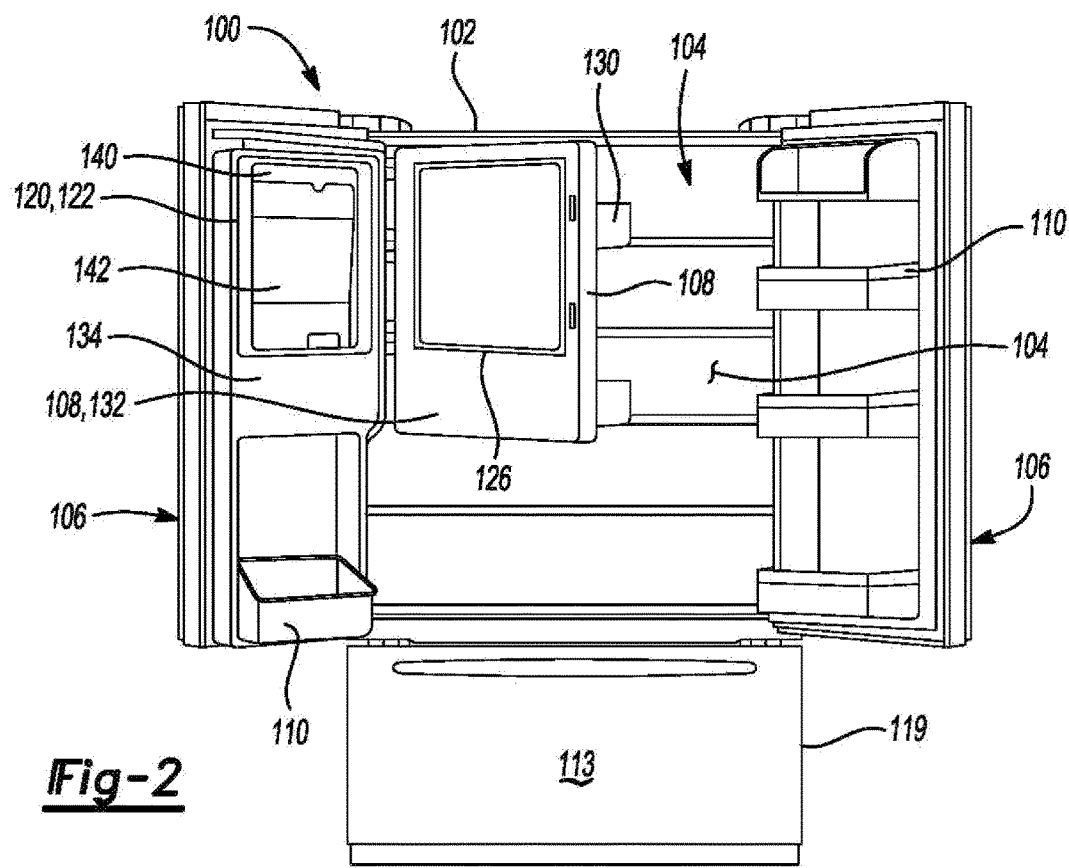
FIG. 2 illustrates a plan view of an elevated front view of a French-Door Bottom Mount type refrigerator with the refrigerator compartment doors open refrigerator shown in FIG. 1.

FIG. 1 generally shows the refrigerator 100. The refrigerator may be of the French-Door Bottom Mount type, but it is understood that this disclosure could apply to any type of refrigerator, such as a side-by-side, two-door bottom mount, or a top-mount type. As shown in FIGS. 1-2, the refrigerator 100 may include a cabinet 102 forming a first internal storage chamber or the fresh food compartment 104 configured to refrigerate and not freeze consumables within the fresh food compartment 104, and a second internal storage chamber or a freezer compartment 113 configured to freeze consumables within the freezer compartment 113 during normal use. The refrigerator 100 includes cabinet walls that define the fresh food compartment 104 and the freezer compartment 113. The refrigerator 100 may have one or more doors 106, 119 that provide selective access to the interior volume of the refrigerator 100 where consumables may be stored. As shown, the fresh food compartment doors are designated 106, and the freezer door is designated 119.

It may also be shown that the fresh food compartment 104 may only have one door 106.

It is generally known that the freezer compartment 113 is typically kept at a temperature below the freezing point of water, and the fresh food compartment 104 is typically kept at a temperature above the freezing point of water and generally below a temperature of from about 35° F. to about 50° F., more typically below about 38° F. As shown in FIG. 2, the ice maker 140 may be located on a door 106 to the refrigerated fresh food compartment 104. As an example, the door 106 may define a receptacle 120 provided with an outer periphery or opening 122 and the ice maker 140 may be disposed therein. The ice maker 140 may be formed by an assembly of a bracket, a motor, an ice tray, a bail arm connected to the motor, at least one wire harness and at least one thermistor. An ice maker, such as the ice maker 140, is disclosed in U.S. Pub. No. 2020/0278142 A1 filed on May 12, 2020, which is incorporated by reference herein in its entirety. The door 106 may include the ice maker 140 and the access door 108 pivotally connected to one of the doors 106 of the refrigerator 100 at a vertical edge closest to the cabinet. The hinge may be a single or multiple hinge(s) and may be spaced along the entire edge, substantially the entire edge, or more frequently, two hinges may be used with one near the top edge of the access door 108 and one close to the bottom edge of the access door 108.

In one or more embodiments, the access door 108 may be configured to translate with respect to door 106 between an open position and a closed position. One or more tracks or guides (not illustrated) may extend from the door 106 and the access door 108 may move e.g., translate along the tracks.

Figure 3:
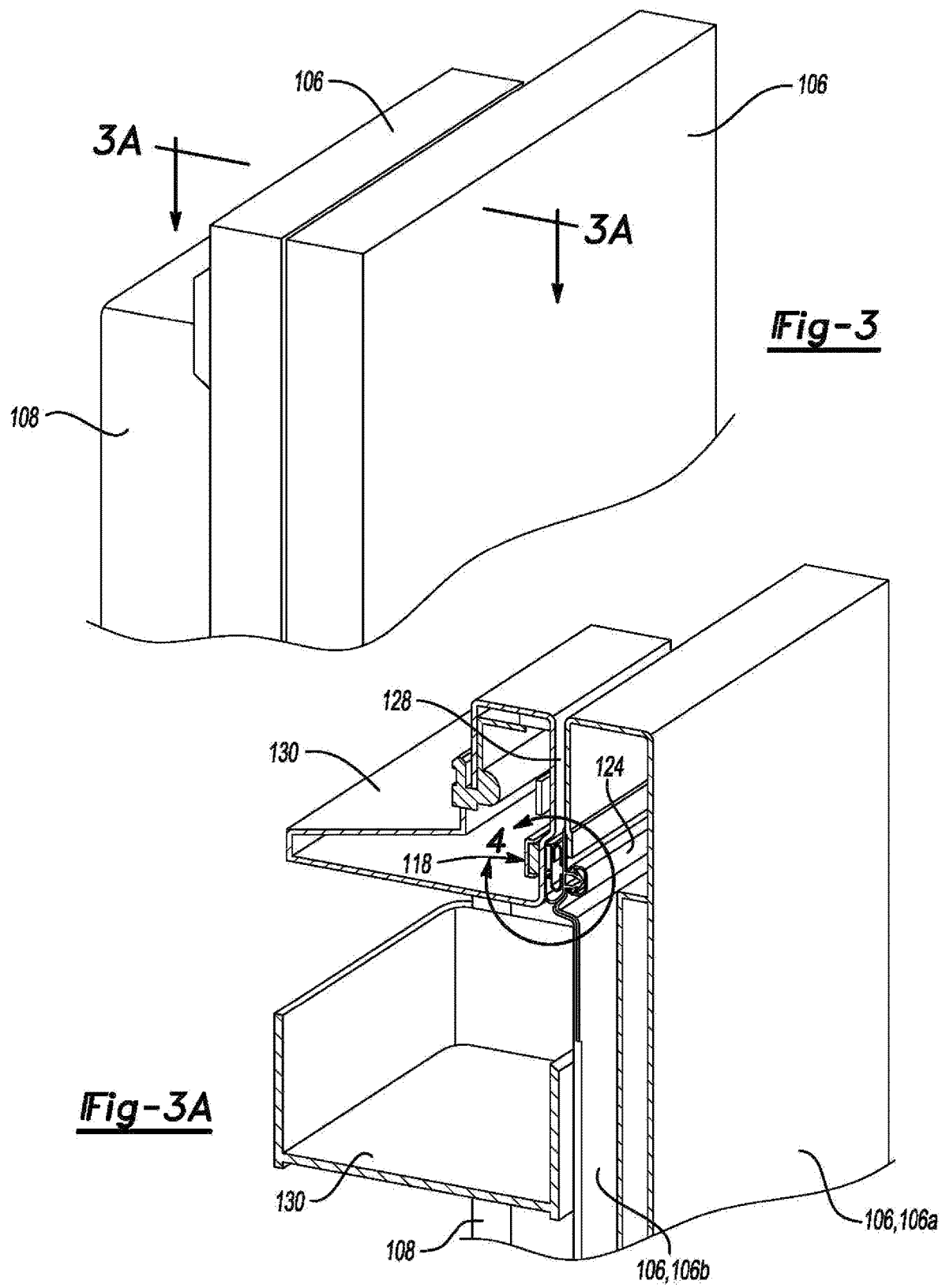
FIG. 3 illustrates a side-perspective view of an exemplary door of a refrigerator such as the refrigerator illustrated in FIGS. 1-2.

Due at least in part to the access door 108 and the design and size of the ice maker 140, the access door 108 has a peripheral edge liner that extends outward from the surface of the access door 108 and defines a dike wall 128. The dike walls 128 extend from at least the two vertical sides, more typically all four sides and define an access door bin 130 along the surface of the access door 108 (FIG. 3). The access door 108 is selectively operable between an open position, in which a mating surface 132 is spaced apart from portions, such as an inner surface 134, of the door 106, and a closed position, in which the mating surface 132 of the access door is adjacent to or lies along the inner surface 132 of the door 106. The access door 108 may include a sealing member such as an access door gasket 126 that may be sized and arranged to engage a periphery of the opening 122 of the receptacle 120 defined by the door. The access door gasket 126 may provide a seal between the ice maker 140 and the access door 108.

When the access door 108 is in the open position, the ice maker 140 and the ice storage container or bin 142 are accessible, and when the access door is in the closed position, the ice maker 140 and the ice storage bin 142 are not accessible. The access door 108 may also include the access door bins 130 that are able to hold smaller food items. The access door bins 130 may also be located on or removably mounted to the access door 108 and at least partially spaced within the door bin receiving volume of the access door 108. While not typically the case, the ice maker 140 may also be located exterior the fresh food compartment 104, such as on top of the refrigerator cabinet, in a mullion between the fresh food compartment 104 and the freezer compartment 113, in a mullion between two fresh food compartments 104, or anywhere else an automatic motor driven ice maker 140 may be located.

The refrigerator 100 may also have a duct or duct system (not shown) with an inlet in the freezer compartment 113 and an outlet in the fresh food compartment 104. The duct may be situated such that the length of the duct necessary to direct air from the freezer compartment 113 to the fresh food compartment 104 is minimized, reducing the amount of heat gained in the travel between the inlet and the outlet. The duct outlet located in fresh food compartment 104 may be positioned at a location near the ice maker 140. The refrigerator 100 may also have one or more fans, but typically has a single fan (not shown) located in the freezer compartment 113 to force air from the freezer compartment 113 to the fresh food compartment 104. The colder air from the freezer compartment 113 is needed in the ice maker 140 because air below the freezing point of water is needed to freeze the water that enters the ice maker 140 to freeze into ice cubes. In the embodiment shown, the ice maker 140 is located in the fresh food compartment 104, which typically holds air above the freezing point of water.

FIG. 3 illustrates a side-perspective view of the fresh food compartment door 106 and the access door 108 disposed in a closed position lying along portions of the door 106. FIG. 3A illustrates a cross-sectional view taken along the lines A-A in FIG. 3. The door 106 and the access door 108 and the dike walls 128 and/or other components described herein may be formed a number of processes including but not limited to injection molding, compression molding, rotation molding, thermoforming, curing, and casting. The door may include an outer panel 106a and an inner panel 106b that may be spaced apart from the outer panel 106a to form a cavity that may receive insulation materials (not illustrated). The magnetic gasket assembly 124 may be fixed (e.g., by adhesive(s), a force-fit condition, or fastened) to an interior surface of the inner panel 106b of the door 106. The magnetic gasket assembly 124 and/or other components may include any thermoplastic, thermoset, or a combination materials thereof, as required.

Figure 4:
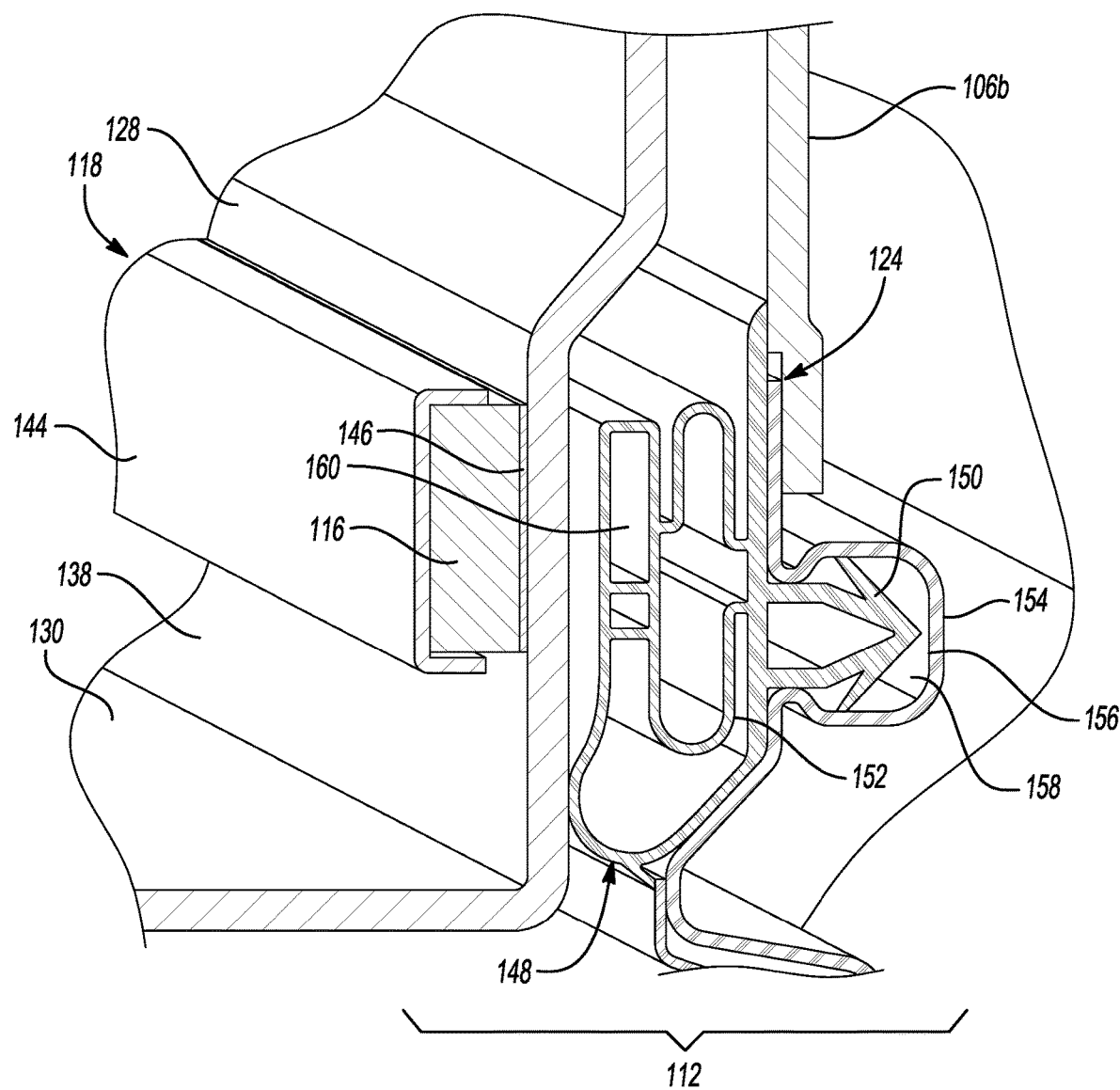
FIG. 4 illustrates a detailed-cross-sectional view taken along the lines 4-4 in FIG. 3A.

As stated above, the access door 108 may include one or more dyke walls 128 that may form or define the access door bins 130. The access door bins 130 may have a substantially hollow structure forming a hollow space defined by the walls of the access door bins 130 and an inner wall 138 (FIG. 4). The magnetic sub-assembly 118 may be disposed on the inner wall 138 of the dyke walls 128 so that magnetic sub-assembly 118 sandwiches the inner wall 138 and the magnetic gasket 124 to the inner panel 106b of the door 106.

FIG. 4 illustrates a detailed-cross-sectional view taken along the lines 4-4 in FIG. 3A. The magnetic closure assembly 112 may include the magnetic sub-assembly 118 and the magnetic gasket assembly 124. As one example, the magnetic sub-assembly 118 may be fixed to one or more of the dyke walls 128 of the access door 108 and the magnetic gasket assembly 124 may be fixed to portions of the door 106 such as the inner panel 106b of the door 106. In another embodiment, the arrangement may be reversed and the magnetic gasket assembly 124 may be fixed to one of the dyke walls 128 and the magnetic sub-assembly 118 may be fixed to portions of the door 106 such as the inner panel 106b of the door 106. The magnetic sub-assembly 118 may be disposed above one or more of the access door bins 130 or another suitable location, as required.

The magnetic sub-assembly 118 may include a housing 144 and a number of first magnets 116 may be fixed to and/or at least partially disposed in the housing 144. The first magnets 116 may be permanent magnets. As used herein, the term "permanent magnet" may refer to one or more materials that emit a magnetic field without the need for any external source of magnetism or electrical power. The magnetic sub-assembly 118 may be fixed to the dyke wall by an adhesive or another suitable fixation arrangement, as required. As an example, the magnetic sub-assembly 118 may be fixed to the dyke wall 128 by an adhesive including but not limited to a double sided tape 146, an adhesive spray, or an adhesive paste.

The magnetic gasket assembly 124 may include a sealing member such as a gasket 148 that may include an attachment member 150 and a number of sealing walls 152 that may extend from the attachment member 150. Another sealing member such as a trim breaker 154 may be fixed to the inner panel 106b and may include a bulbous wall portion 156 that may form a pocket 158. The pocket 158 may be configured to receive the attachment member 150 to attach the gasket 148 to the trim breaker 154. One or more of sealing walls 152 may form an opening or pocket that may receive a second magnet or a second number of magnets 160. The second number of magnets 160 may be arranged to cooperate with the first number of magnets 116 so that a magnetic force is generated between the magnetic sub-assembly 118 and the magnetic gasket assembly 124 to bias the access door 108 and the door 106 towards one another.

In one or more embodiments, the first number of magnets 116 and/or the second number of magnets 160 may be a neodymium magnet. Alternatively, the first number of magnets 116 and/or the second number of magnets 160 may include or may be made from iron, alnico, bismanol, cobalt, nickel, chromium (IV) oxide, dysprosium, ferrite, gallium manganese arsenide, KS steel, sintered barium ferrite, MKM steel, permalloy, samarium-cobalt, suessite, and combinations thereof.

Figure 5:
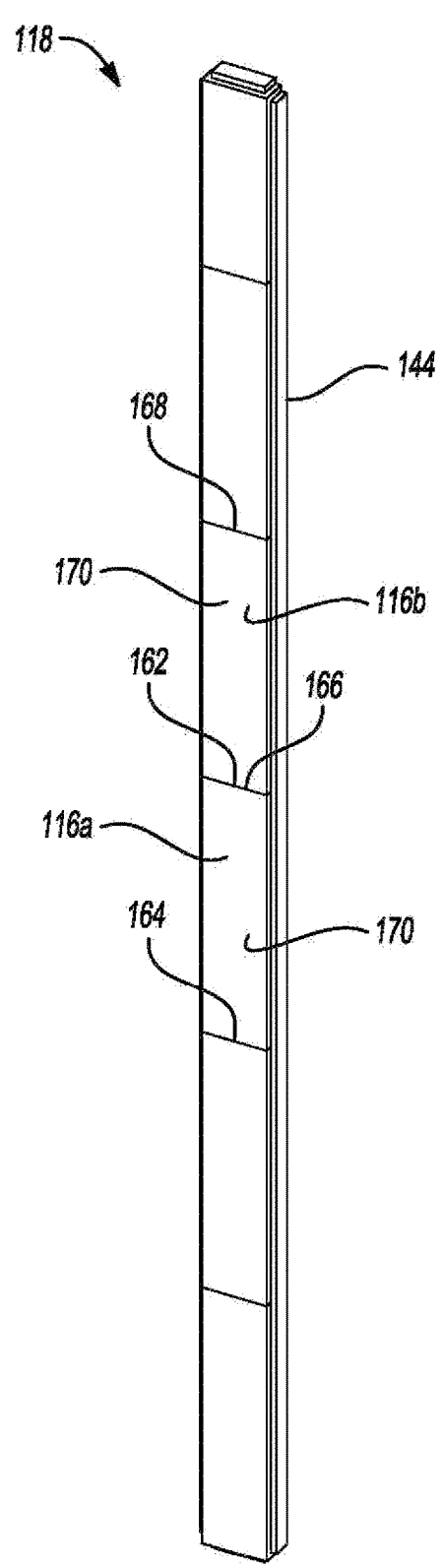
FIG. 5 illustrates a perspective view of an exemplary magnetic sub-assembly.
Figure 6:
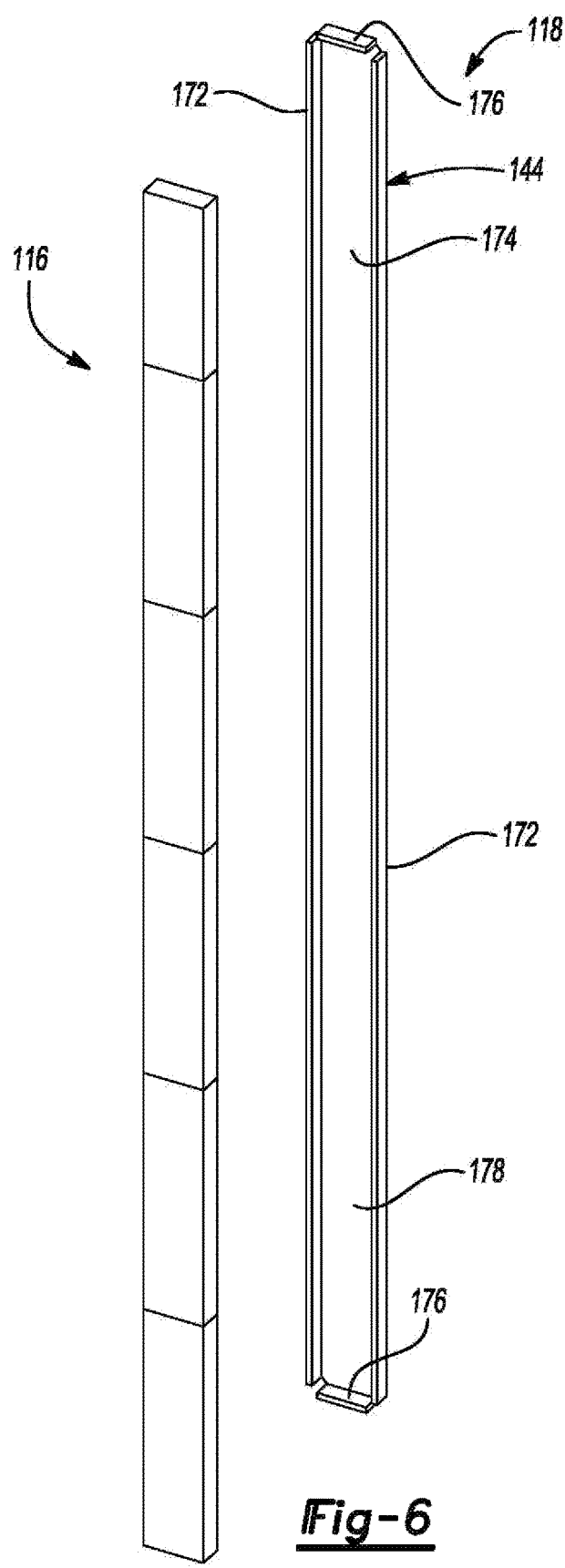
FIG. 6 illustrates an exploded-perspective view of the exemplary magnetic sub-assembly.

FIG. 5 illustrates a perspective view of the magnetic sub-assembly 118 according to one or more embodiments and FIG. 6 illustrates a perspective-exploded view of the magnetic sub-assembly 118 illustrated in FIG. 5. The first number magnets 116 may be arranged end to end with respect to one another. As an example, a first magnet 116a may include a first end 162 and a second end 164 and a second magnet 116b may include a first end 166 and a second end 168. The first magnet 116a may be arranged with respect to the second magnet 116b so that the first end 162 of the first magnet 116a lies against or abuts the first end 166 of the second magnet 116b.

In one or more embodiments, the first number of magnets 116 may be at least partially disposed in a sleeve, such as the housing 144 so that the first number of magnets 116 are attached to the housing by a force-fit or snap-fit condition. As another example, the housing 144 may be formed of one or more alloys or metals that may include iron, such as ferritic stainless steel or another suitable metal, as required. The housing 144 may be a temporary magnet or have magnetic properties so that the first number of magnets 116 are fixed to the housing by magnetic attraction. As yet another example, an adhesive (not illustrated) may be provided on portions of the housing 144 that may engage the first number of magnets 116 to fix the first number of magnets 116 to the housing 144. As used herein, the term "temporary magnet" may refer to materials that behave as magnets while attached to or close to something that emits a magnetic field, but lose this characteristic when the source of the magnetic field is removed.

Each of the first magnets 116 may include a number of faces and two magnetic poles. As an example, a first face 170 of the number of faces may at least form one or more of the two magnetic poles. Each of the first faces 170 of the first number of magnets 116 may be arranged to face in the same direction and lie within a common plane so that the one of the magnetic poles, either the north pole or the south pole face in the same direction. The adhesive such as the double-sided tape 146 (FIG. 4) may be applied to cover one or more of the faces 170 of each of the first number of magnets 116. In one or more embodiments, the adhesive may be applied to each of the first number of magnets 116 prior to inserting or attaching the first number of magnets 116 to the housing 144. As an example, the first number of magnets 116 may be purchased with the adhesive applied to each of the first number magnets 116 from a third party or supplier and an integrator or manufacturer of the appliance may insert the first number of magnets 116 provided with the adhesive into the housing 144. As another example, the adhesive may be applied after the first number of magnets 116 are inserted or attached to the housing 144.

The housing 144 may include a pair of longitudinal flanges 172 that may extend from first and second edges of a base member 174. A pair of lateral flanges 176 may extend from third and fourth edges that may be oblique or substantially orthogonal to the first and second edges of the base member. The pair of lateral flanges 176 and the pair of longitudinal flanges 172 may collectively form a recess or pocket 178 that may be sized to receive a number, such as seven, of the first number of magnets 116. In one or more embodiments, the housing may be formed by a stamping process including but not limited to progressive, fourslide, or deep draw stamping processes. The stamping process may include feeding a coil or sheet of metal, blanking portions of the coil into a blank, piercing or cutting the blank to remove portions thereof, and bending or flanging the pair of lateral flanges 176 and the pair of longitudinal flanges 172 from the base member 174.

Figure 7:
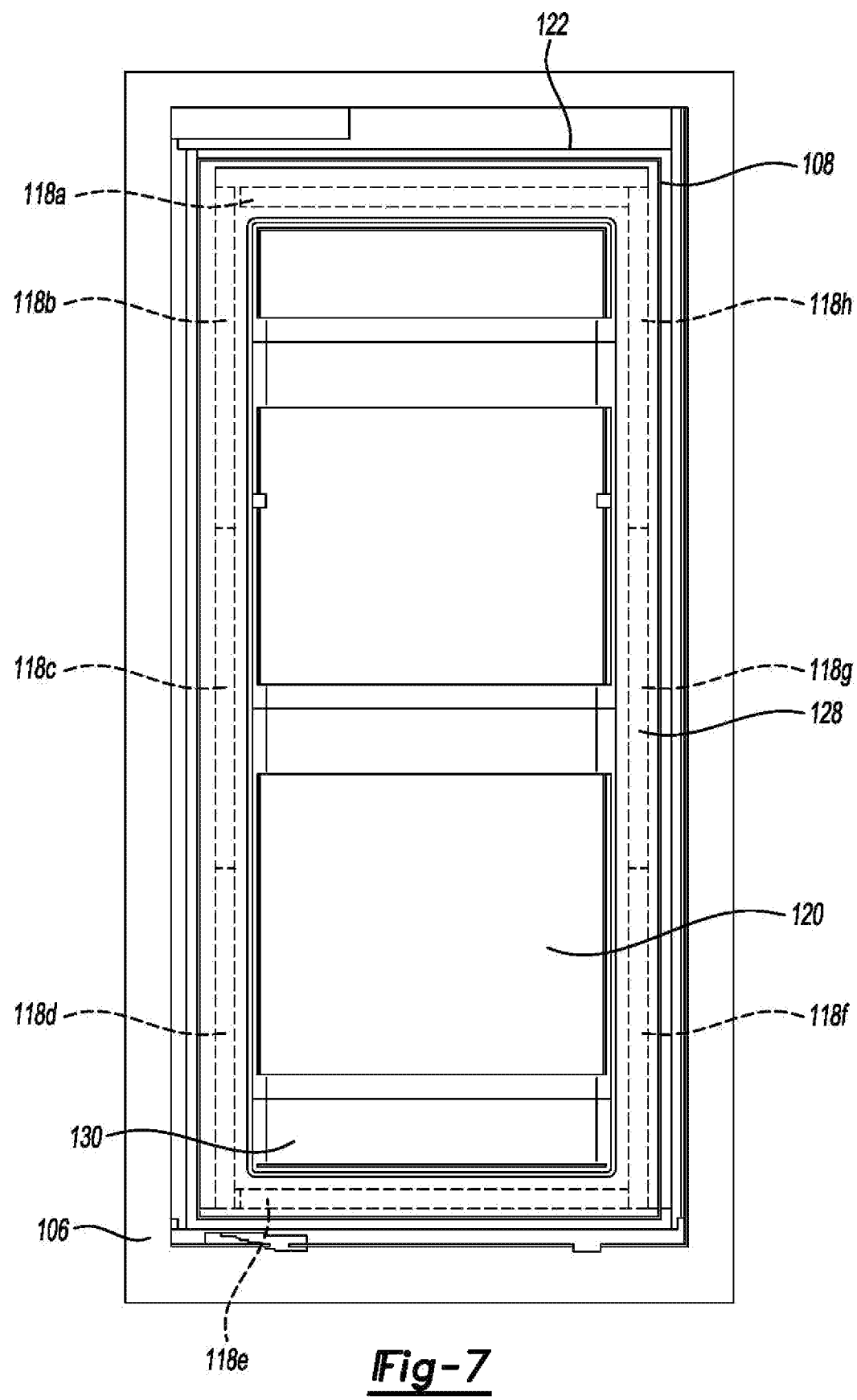
FIG. 7 illustrates a plan view of an exemplary refrigerator door provided with a number of magnetic sub-assemblies.

FIG. 7 illustrates a plan view of the refrigerator door 106 provided with a number of magnetic sub-assemblies 118. The door 106 may include the access door 108 that may be configured to move (e.g., pivot) with respect to door 106 between an open position (FIG. 2) and a closed position, as illustrated here. The access door 108 may cover the receptacle 120 when the access door 108 is in the closed position and the receptacle 120 may be uncovered and accessed when the access door 108 is in the open position. One or more magnetic sub-assemblies 118, such as eight magnetic sub-assemblies 118a-118h, represented by hidden lines, may be disposed on one or more of the dyke walls 128. In one or more embodiments, the magnetic sub-assemblies 118a-118h may be perimetrically disposed about the access door 108 so that peripheral portions of the access door 108 cooperate other magnets, such as the second number of magnets 160 disposed in the magnetic gasket assembly 124 (FIG. 4). As an example, the magnetic sub-assemblies 118a-118h may be positioned end-to-end or adjacent to one another. As another example, the magnetic sub-assemblies 118a-118h may be spaced apart from one another.

In one or more embodiments, the magnetic sub-assemblies 118a-118h may be arranged and fixed to the access door 108 manually that may include one or more operators removing the cover of the double-sided tape 146 (FIG. 4) and placing the adhesive portion to the desired location on the access door or, more specifically, the dyke walls 128 of the access door. As another example, an automatic process such as a robot or other suitable equipment may be employed to place and attach the magnetic sub-assemblies 118a-118h to the access door 108.

Figure 8:
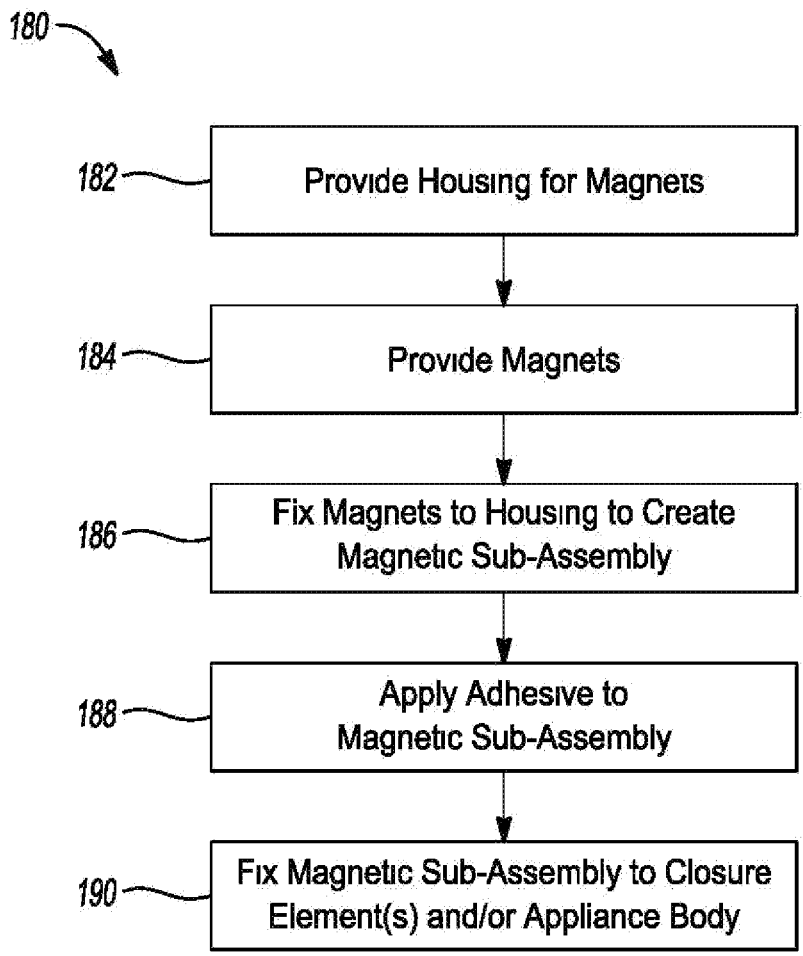
FIG. 8 illustrates a flow chart for a method of assembling the magnetic sub-assembly to an appliance.

FIG. 8 illustrates a flow chart for a method 180 of assembling the magnetic sub-assembly 118 to an appliance such as the refrigerator 100. The flowchart in FIG. 8 is for illustrative purposes only and the method 180 should not be construed as limited to the flowchart in FIG. 8. Some of the steps of the method 180 may be rearranged while others may be omitted entirely.

In one or more embodiments, the method may include operation 182 that includes providing the housing 144 of the magnetic sub-assembly 118. The housing may be formed by a stamping process as described in greater detail above. The stamping process may include feeding a coil or sheet of metal, blanking portions of the coil into a blank, piercing or cutting the blank to remove portions thereof, and bending or flanging the pair of lateral flanges 176 and the pair of longitudinal flanges 172 from the base member 174. In another embodiment, the housing may be formed of a plastic or polymeric materials by injection molding. As another example, the first number of magnets 116 may be overmolded by a plastic or polymeric housing 144 to form the magnetic sub-assembly 118.

In operation 184, the first number of magnets 116 may be formed or provided. As one example, the first number of magnets 116 may be formed by a powder metallurgy process, in which a suitable composition is pulverized into fine powder, compacted and heated to cause densification via "liquid phase sintering" to form sintered magnets that may include Ferrite, Samarium Cobalt (SmCo) and neodymium-iron-boron (neo) magnets. This process may include melting raw materials under vacuum or inert gas in an induction melting furnace. The melted materials may be compressed or compacted and undergo a magnetic aligning process to apply an aligning magnetic field to magnetize the material. Prior to or after the aligning process, the materials may be sintered and finished by grinding to smooth the outer surfaces of the sintered materials to form the first number of magnets 116.

The first number of magnets 116 may be fixed to the housing 144 by inserting each of the first number of magnets 116 into the housing 144. As an example, the first number of magnets 116 may generate a magnetic attraction to the housing 144 so that the number of magnets 116 are fixed to the housing, as represented by operation 186. Adhesive, such as double-sided tape 146 may be applied to one or portions (e.g., the first faces 170) of the first number of magnets 116, as represented by operation 188. As another example, an adhesive spray may be dispersed on portions of the first number of magnets 116. The magnetic sub-assembly 118 or magnetic sub-assemblies 118a-118h may be arranged and fixed to, by the adhesive, to one or more portions of the door 106, access door 108, or another portion of the refrigerator 100, as required and represented by operation 190.

As described above, in one or more embodiments the access door 108 may receive one or more of the magnetic sub-assemblies 118a-118h such as eight magnetic sub-assemblies 118a-118h. Each of the magnetic sub-assemblies 118a-118h may include one or more (e.g., seven) first number of magnets 116. Accordingly, if each of the first number of magnets were individually assembled to the access door, the operator or robot, is required to place and fix fifty-six of the first magnets 116 to the refrigerator (e.g., the access door 108). Whereas the magnetic sub-assembly 118 may only require the operator or robot to place one or more (e.g., seven) of the magnetic sub-assemblies 118 to the refrigerator (e.g., the access door 108). This may provide a significant reduction in time and labor costs. Additionally or alternatively, because the first number of magnets 116 are contained in a number of the sub-assemblies 118a-118h, the first number of magnets 116 may be placed more accurately or precisely in desired locations. More consistent placement of the first number of magnets 116 may prevent or mitigate incorrect assembly to provide suitable magnetic forces for sealing the access door 108 to the door 106.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of assembling a magnetic closure assembly to an appliance provided with a body and a closure configured to move between a closed position, in which a mating surface of the closure lies along the body, and an open position, in which the mating surface is spaced apart from the body, the method comprising:
   forming a sleeve configured to house a number of first magnets;
   fixing the number of first magnets to the sleeve to form a magnetic sub-assembly;
   applying an adhesive to the magnetic sub-assembly;
   attaching the magnetic sub-assembly to at least one of the closure or the body via the adhesive; and
   positioning the magnetic sub-assembly on the at least one closure or the body such that the magnetic sub-assembly is configured to cooperate with a number of second magnets disposed on the other of the at least one closure or the body, so that when the closure is in the closed position or a partially open position, a magnetic force between the magnetic sub-assembly and the number of second magnets biases the closure towards the body.

2. The method of claim 1, wherein the adhesive is a double-sided tape and the applying step includes fixing the double-sided tape to the magnetic sub-assembly.

3. The method of claim 1, wherein the sleeve is formed of temporary magnetic material and the first number of magnets are formed of permanent magnetic material.

4. The method of claim 1, wherein the attaching step includes attaching the magnetic sub-assembly to the closure.

5. The method of claim 4, wherein the attaching step includes attaching the magnetic sub-assembly to a rear wall of the closure, relative to a position of the number of second magnets so that the magnetic sub-assembly and the second number of magnets are disposed in a common plane.

6. The method of claim 1, wherein the forming step includes stamping a piece of sheet metal to form a base portion and a plurality of sidewalls, wherein the base portion and the plurality of sidewalls collectively form the sleeve.

7. The method of claim 1, further comprising:
   attaching a magnetic gasket member to the other of the at least one closure or the body so that the magnetic gasket lies in a common plane with the magnetic sub-assembly, and wherein the positioning step includes positioning the magnetic sub-assembly so that the magnetic sub-assembly cooperates with the magnetic gasket member to generate the magnetic force.

8. A method of assembling a magnetic closure assembly to an appliance provided with a body and a closure configured to move between a closed position, in which a mating surface of the closure lies along the body, and an open position, in which the mating surface is spaced apart from the body, the method comprising:

attaching a number of magnets to a number of sleeves to form a number of magnetic sub-assemblies;

applying an adhesive to the number of magnetic sub-assemblies; and positioning the number of magnetic sub-assemblies on the closure so that the number of sub-assemblies are fixed to the closure by the adhesive and positioned to cooperate with the body so that when the closure is in the closed position or a partially open position, a magnetic force between the magnetic sub-assembly and the body biases the closure towards the body.

9. The method of claim 8, wherein the attaching step includes inserting the number of magnets into recess formed by a plurality of sidewalls of each sleeve of the number of sleeves.

10. The method of claim 9, wherein the inserting step includes attaching the number of magnets into the recess to form a force-fit condition between a first magnet of the number of magnets and a first sleeve of the number of sleeves.

11. The method of claim 8, further comprising:

attaching a magnetic gasket member to the body so that the magnetic gasket is perimetrically disposed about at least a portion of an opening defined by the body and lies in a common plane with at least one magnetic sub-assembly of the number of magnetic sub-assemblies, and wherein the positioning step includes positioning the magnetic the number of magnetic sub-assemblies so that the number of magnetic sub-assemblies cooperate with the magnetic gasket member to generate the magnetic force.

12. The method of claim 8, wherein the number of sleeves include an open end and faces of the number of magnets attached to the number of sleeves are exposed by the open end, wherein the applying step includes applying the adhesive to the faces of the number of magnets.

13. The method of claim 12, wherein the applying step includes dispersing a spray adhesive to the exposed faces.

14. The method of claim of claim 8, wherein the attaching step includes orienting each of the magnets so that magnetic poles of each of the magnets of the number of magnets attached to a sleeve of the number of sleeves are arranged in a common plane.

15. The method of claim 8, wherein the attaching step includes positioning each of the magnets of the number of magnets within a sleeve of the number of sleeves so that each of the magnets are positioned end-to-end.

16. A method of assembling a closure assembly for a refrigerator, the method comprising:

forming a first body defining a first opening and a first receptacle accessible through the first opening;

molding plastic material into a second body configured to be fixed to the first body and configured to move between an open position, in which the opening is open, and a closed position, in which the opening is closed;

attaching a magnetic gasket member to the first body so that the magnetic gasket is perimetrically disposed about one or more portions of the opening;

fixing a first number of magnets to a first sleeve to form a first magnetic sub-assembly; and positioning the first magnetic sub-assembly on a wall of the closure so that the first magnetic sub-assembly is fixed to the wall and lies in a common plane with a first portion of the magnetic gasket member.

17. The method of claim 16, further comprising:

fixing a second number of magnets to a second sleeve to form a second magnetic sub-assembly; and positioning the second magnetic sub-assembly on the wall of the closure so that the second magnetic sub-assembly is fixed to the wall and extends in a first direction, and wherein the positioning the first magnetic sub-assembly step includes orienting the first magnetic sub-assembly so that the first magnetic sub-assembly extends in a second direction, wherein the second direction is substantially orthogonal to the first direction.

18. The method of claim 16, wherein the first number of magnets is equal to seven.

19. The method of claim 16, further comprising:

stamping a sheet of temporary magnetic material to form a base member and a pair of lateral flanges extending therefrom, to form the sleeve.

20. The method of claim 19, wherein the stamping step includes forming at least one end flange extending from the base member, wherein the at least one end flange and the pair of lateral flanges collectively form a pocket of the sleeve configured to receive the first number of magnets.

* * * * *

UNITED STATES PATENT AND TRADEMARK OFFICE
CERTIFICATE OF CORRECTION

| | |
|---|---|
| PATENT NO. | : 11,635,249 B1 |
| APPLICATION NO. | : 17/533500 |
| DATED | : April 25, 2023 |
| INVENTOR(S) | : Jackson Felipe Karl |

It is certified that error appears in the above-identified patent and that said Letters Patent is hereby corrected as shown below:

In the Claims

Column 11, Lines 27-28, Claim 11:
After "and wherein the positioning step includes positioning"
Delete "the magnetic".

Signed and Sealed this
Twelfth Day of March, 2024

*Katherine Kelly Vidal*

Katherine Kelly Vidal
*Director of the United States Patent and Trademark Office*